US006735067B2

(12) United States Patent
Monjaux

(10) Patent No.: US 6,735,067 B2
(45) Date of Patent: May 11, 2004

(54) SPARK GAP DEVICE FOR HIGH-POWER ELECTRICAL GENERATORS

(75) Inventor: Philippe Monjaux, Gramat (FR)

(73) Assignee: Etat Francais Represente par la Delegue General pour l'Armement (FR)

(*) Notice: Subject to any disclaimer, the term of this patent is extended or adjusted under 35 U.S.C. 154(b) by 93 days.

(21) Appl. No.: 09/988,016

(22) Filed: Nov. 16, 2001

(65) Prior Publication Data

US 2002/0145844 A1 Oct. 10, 2002

(30) Foreign Application Priority Data

Nov. 16, 2000 (FR) ........................................... 00 14764

(51) Int. Cl.[7] .................................................. H02H 1/00
(52) U.S. Cl. ........................ 361/120; 361/132; 361/220
(58) Field of Search ................................ 361/120, 129, 361/132, 220

(56) References Cited

U.S. PATENT DOCUMENTS

| | | | | | |
|---|---|---|---|---|---|
| 3,169,208 | A | | 2/1965 | Harrington | |
| 4,277,812 | A | * | 7/1981 | Jones | 361/119 |
| 5,142,194 | A | * | 8/1992 | Jacubeit et al. | 313/603 |

OTHER PUBLICATIONS

B. M. Kovalchuk, "Multi Gap Spark Switches," 1997 IEEE, pp. 59–67, (no month).

* cited by examiner

*Primary Examiner*—Jessica Han
(74) *Attorney, Agent, or Firm*—Parkhurst & Wendel, L.L.P.

(57) ABSTRACT

A high-voltage spark gap device for operation in conjunction with a high-power electric generator and including an electric trigger system and at least two mutually spaced spherical main electrodes that cooperate pairwise and face each other, means for closing the current loop that are separated by a dielectric from the electrodes, the electric trigger system having as many trigger electrodes as there are main electrodes, the trigger electrodes being fitted with an insulating protector received in each main electrode of the device.

9 Claims, 3 Drawing Sheets

SPARK GAP DEVICE FOR HIGH-POWER ELECTRICAL GENERATORS

The present invention relates to the technical field of pulsed, high-power electrical generators and in particular to high-voltage spark gap devices operating in conjunction with such generators.

Using spark gap devices with high-power electrical generators, a set of specific criteria is involved, among which foremost that of their inductance which must be low in order to attain the shortest discharge times.

A number of designs already have been proposed in this field.

The monogap spark device is a gas spark-gap device consisting of two mutually opposite main electrodes. The trigger electrode is configured between the two main ones and when a high-amplitude pulse is applied to this trigger electrode, it will create electrical paths in the gases at regular time intervals under optimal conditions.

This spark gap device entails the drawback that its inherent geometry precludes low inductances despite the formation of several electrical paths. Illustratively a spark gap device of this design entails a minimum inductance of about 20 nh.

Another spark gap device design already has been proposed. This is the surface spark gap. It operates substantially on the same principle as the above described single gap spark gap devices, except that the current paths follow the surface of a dielectric and hence are situated closer to the current-loop closing means. Even if the latter entail a low and admissible inductance of about 5 nh, they still may not be used for the high voltages that are fed from the high-voltage generators in conjunction with which the spark gap devices must operate. The main difficulty is to adjust the triggering system within the spark gap device—when it can be done at all.

Lastly a third known spark gap device is the multiple spark gap device of low inductance wherein the charge voltage is spread across several gaps. In this design, a main electrode receives a voltage pulse and enables the closing of the gaps by capacitive coupling.

While the performance of this spark-gap device is fairly satisfactory and it matches high-voltage generators, it does nevertheless incur some drawbacks. In the first place a simple change in the geometry of this spark gap device mandatorily entails making a new mold. As a result additional costs are caused by cold molding—which is an elaborate and uncertain procedure as noted by the high number of malfunctions of several series of spark gap devices of this kind. Also, to attain optimal operation, the trigger electrode must be molded into a dielectric structure between the current paths and the current-loop closing means. This feature is near mandatory and precludes moving the current paths and the current-loop closing means nearer each other in order to lower the spark gap device's inductance. Another drawback is that the inductance of this spark gap device still is excessive and as a result research into the electric arcs from the path generating main electrodes shows that not all the paths are initiated: when a first path is formed, the voltage at the spark gap device terminals drops and may affect the closure of the other paths. Accordingly the observed inductance of about 10 to 15 nh of this spark gap device is too high to assure proper spark gap device operation when a high voltage is applied to it.

The objective of the present invention is to remedy the above described drawbacks by proposing a high-voltage spark gap device allowing substantial reduction of its inductance so as to attain triggering all arcing paths at each discharge, and to do so at very high voltages.

Another objective of the present invention is to create a reliable spark gap device making possible a mechanical design circumventing molding the spark-gap device case and thus allowing flexibility when determining operational parameters such as gap size and number of arcing paths.

Lastly the purpose of the invention is improving high-power electric generator performance while reducing manufacturing costs by means of some product independence from the manufacturing process.

Accordingly the objective of the present invention is a spark gap device for a high-power electric generator, namely a high-voltage spark gap device comprising an electric trigger system, furthermore two mutually spaced main electrodes in particular spheres, which operate pairwise and which are mutually oppositely situated, and current-loop closing means that are separated by a dielectric from the main electrodes, said spark gap device being characterized in that the electric trigger system is fitted with as many trigger electrodes as there are main electrodes in the spark-gap device, said trigger electrodes being fitted with a protective insulator and each being received in a different spark-gap device main electrode.

Preferably the spark-gap device main electrodes are kept on the dielectric by means of slides.

The main electrodes are able to slide within these slides and can be individually pressed against the dielectric by means such as springs.

In a preferred embodiment of the invention, the spark gap device is a high-voltage, multigap device operating in air at ambient or higher pressure, the gaps between the main electrodes being controlled by spacers.

The dielectric used in the spark gap device which is the object of the present invention consists of thin insulating layers. Moreover the protective insulator of the trigger electrodes may be implemented by a high-voltage cable.

The invention offers the advantage of a high-voltage spark gap device of a design much simpler than those of the extant spark gap devices. As a result such spark gap devices of the invention are more economical.

Another advantage of the present invention is the improvement in performance of the spark gap devices cooperating with high-power generators on account of reducing the spark-gap device inductance and thereby enabling closing all paths at each firing.

The invention is further discussed below in relation to the attached drawings.

FIGS. 1 through 3 show a high-voltage spark gap device to be used with a high-power electric generator.

The spark gap device of the invention may assume several embodiment modes; this feature is one of the advantages of such a spark gap device which may be matched to different applications by means of different numbers of gaps and paths.

Figure 1:
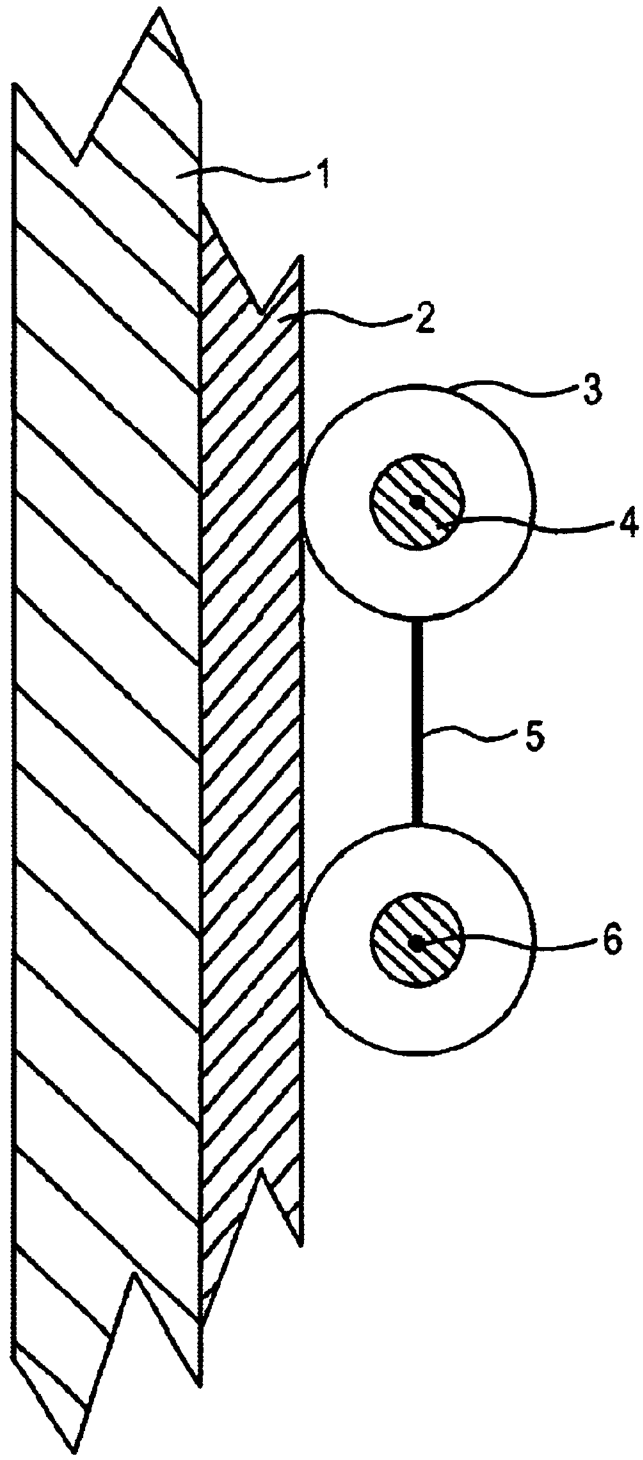
FIG. 1 is a schematic cross-sectional sideview of part of the spark gap device of the invention fitted with two main electrodes.

FIG. 1 shows schematically part of the spark gap device of the invention, comprising two main electrodes 3. Preferably these main electrodes 3 are spherical and mutually apart. They cooperate with each other and subtend an electric path 5 between them. This path shall be created using an electric trigger system 4, 6 comprising two trigger electrodes 6. In general this system includes as many trigger electrodes 6 as there are spherical main electrodes 3. These spherical main electrodes are fitted with insulating protection 4 preferably in the form of the sheath of a high-voltage cable. Each trigger electrode then shall be received in a different spherical main electrode 3 in a one-to-one relationship of the trigger electrodes 4 to the spherical main electrodes 3. However the insertion of the trigger electrode into the main electrodes of the spark gap device does not depend on the main electrode shape.

Accordingly the spark gap devices of the invention are coupled capacitively, and such capacitive coupling initiating the spark-gap device triggering is implemented at the very inside of the spherical main electrode 3—no longer outside the main electrode as in the prior art.

These main electrodes 3 make contact with a dielectric 2 which preferably is composed of thin insulating layers that rest on means 1 implementing the current-loop closing means. Such a configuration of the various components allows considerably reducing the spark-gap device inductance due to thinness of the insulator 2 between the main electrodes 3 and the current-loop closing means 1.

The width of the dielectric 2 was reduced not only because the trigger electrode 6 was integrated inside the main electrodes 3 but also because using a set of such fasteners holding the main electrodes against the dielectric which do not require molding them into the dielectric. These diverse steps contributed substantially to move the main electrodes 3 closer to the current loop closing means 1 and hence to reduce the spark gap inductance to assure said spark gap's improved operation.

Figure 2:
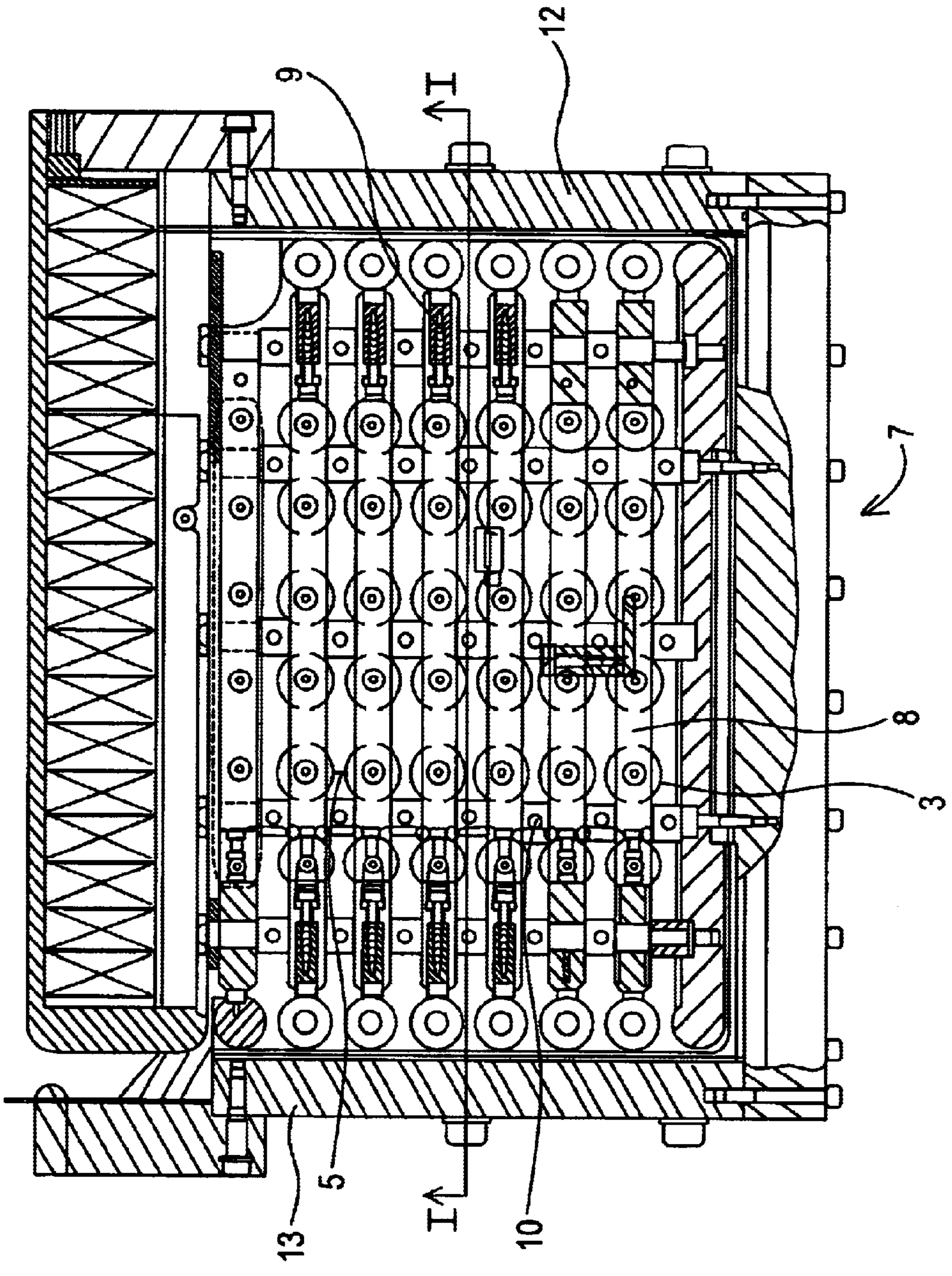
FIG. 2 is a half cross-sectional sideview of a spark gap device of a particular embodiment of the invention.
Figure 3:
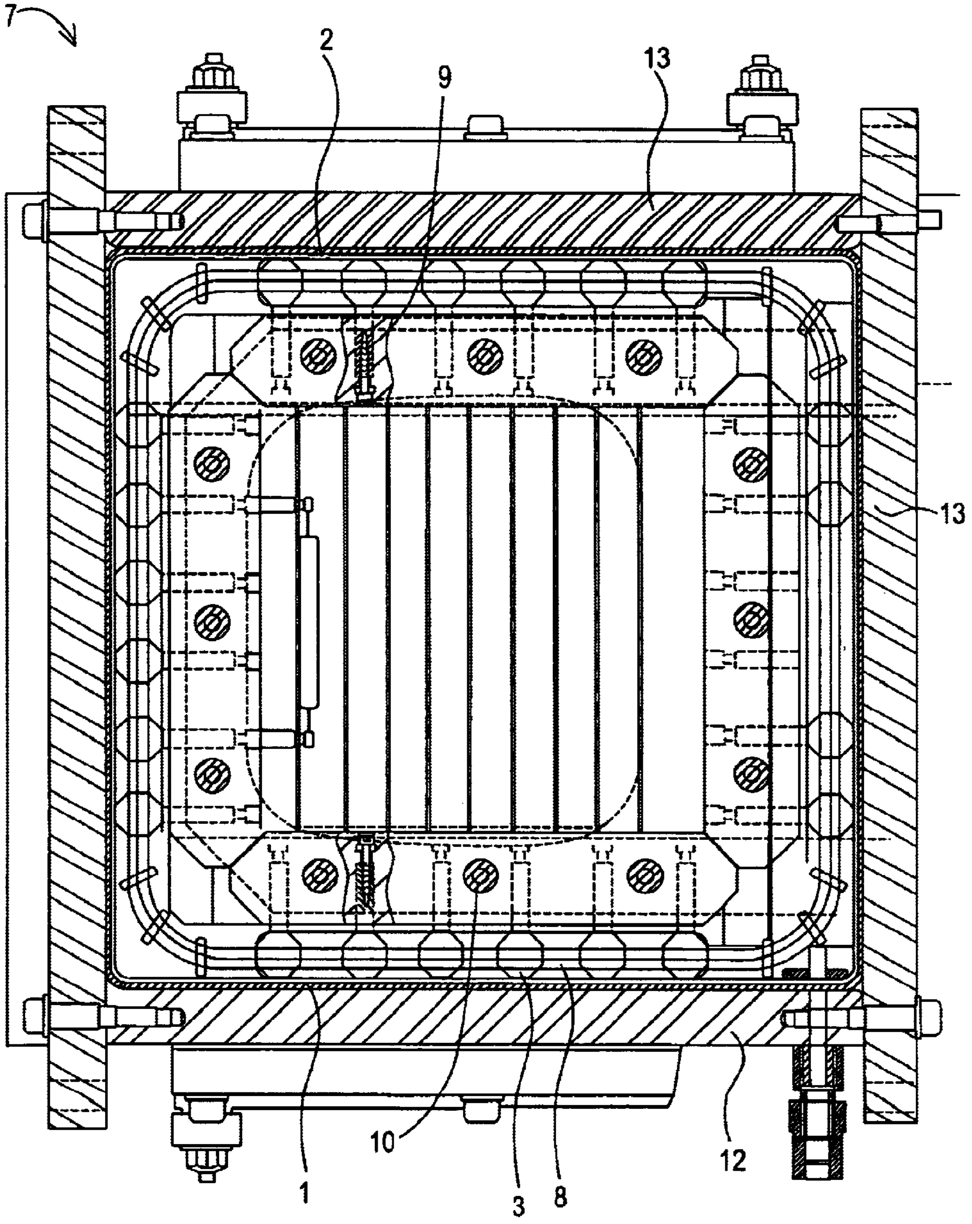
FIG. 3 is a sectional view along the plane defined by the line I—I of FIG. 2.

With respect to FIGS. 2 and 3, the spark gap device of the invention may comprise a number of electric paths 5 and a number of different gaps depending on the application of said device. The particular configuration of the multi-path and multi-gap spark device 7 of FIGS. 2 and 3 is merely illustrative. This spark gap device 7 comprises twenty-two paths 5 and seven gaps. It comprises a substantially parallelipipedic and hollow framework 12, its longitudinal side walls 13 being covered on their inside by current loop closing means 1. These current loop closing means 1 in turn are covered by the dielectric 2 which shall receive a contacting set of main electrodes 3 on each side wall, said set of main electrodes 3 being divided into two sub-sets (only one being shown in FIG. 2). Accordingly these sub-sets comprise a given number of main electrodes each of which is affixed to one of the slides 8 which preferably are made of polyvinyl chloride and configured to be mutually parallel, comprising as many fasteners for the main electrodes 3 as there are desired paths to be initiated from those main electrodes on a given slide. Said slides furthermore may also be made of another commonplace solid dielectric material such as polyethylene, polycarbonate, polyurethane, depending on the environment to which the material shall be exposed.

Illustratively the spark gap device of FIG. 2 shows slides 8 fitted with six fasteners each receiving a main electrode 3 which is able to cooperate with another mutually opposite main electrode 3 and spaced from it by a gap. This interelectrode gap is controlled by a spacer 10 preferably made of polyvinyl chloride and situated between two consecutive slides. Again as with the slides, said spacers as may be made of another solid, commonplace dielectric materials if the spark gap device shall be exposed to a particular environment. The number of gaps is determined by the desired number of slides plus one.

The sets of slides and spacers or the like in this manner makes it possible to manufacture a spark gap device of simple and easily varied design. Merely changing the number of fasteners and the spacer widths defining the gap suffices to match the spark gap device to the user's needs.

As already specified above, the main electrodes 3 are forced by means of springs 9 or the like against the dielectric 2 which preferably consists of thin insulating layers. Such means 9 therefore allow applying pressure on each main electrode 3 toward the outside of the frame 12 and against the dielectric 2. In this manner the main electrodes may slide within the fasteners of the slide 8 until they shall make contact with the dielectric 2.

Be it borne in mind that when operating such a spark gap device—of which the trigger electrode 6 also may be in the form of a rigid tube that is enclosed by an arbitrary insulator and that at the same time assures the function of support on the frame 12—more desirable results are attained with respect to the spark gap device's inductance: its inductance for a design containing 22 electric paths and 7 gaps remains below 5 nh, and consequently during each firing, all electric paths are observed being closed.

By selecting the number of gaps, the spark gap device may be operated in air at atmospheric pressure, and as a result both said device and its design are even more simplified. However this kind of spark gap device also operates very well at higher pressures.

Obviously various modifications may be introduced by the expert in the above described spark gap device which was discussed in merely illustrative manner, without implying restriction and without thereby transcending the scope of the invention.

What is claimed is:

1. A high voltage spark gap device for a high-power electric generator, comprising:

an electric trigger system;

at least two mutually spaced spherical main electrodes that cooperate pairwise; and means for closing a current loop that are separated by a dielectric from the main electrodes, wherein the electric trigger system comprises as many trigger electrodes as there are main electrodes in the spark gap device, said trigger electrodes each including a protective insulator and said trigger electrodes each located in a different main electrode of the spark gap device.

2. The high voltage spark gap device according to claim 1, further comprising slides, wherein said slides hold said main electrodes in place on the dielectric.

3. The high voltage spark gap device according to claim 2, further comprising means for urging the main electrodes to slide in the slides against the dielectric.

4. The high voltage spark gap device according to claim 3, wherein said means for urging each main electrode comprises a spring.

5. The high voltage spark gap device according to claim 1, wherein the dielectric comprises thin insulating layers.

6. The high voltage spark gap device according to claim 1, wherein the protecting insulator comprises a portion of a high-voltage cable.

7. The high voltage spark gap device according to claim 1, wherein the trigger electrode comprises a rigid tube.

8. The high voltage spark gap device according to claim 1, further comprising a spacer, wherein said device is a high-voltage, multi-gap spark device for operating in air at atmospheric pressure, a gap between the main electrodes being controlled by said spacer.

9. The high voltage spark gap device according to claim 8, wherein said device is operative at a pressure higher than atmospheric pressure.

* * * * *